(12) United States Patent
Crabtree

(10) Patent No.: US 9,599,981 B2
(45) Date of Patent: Mar. 21, 2017

(54) ELECTRONIC APPLIANCE STATUS NOTIFICATION VIA A HOME ENTERTAINMENT SYSTEM

(75) Inventor: Michael John Crabtree, Keighley (GB)

(73) Assignee: EchoStar UK Holdings Limited, Steeton (GB)

( * ) Notice: Subject to any disclaimer, the term of this patent is extended or adjusted under 35 U.S.C. 154(b) by 103 days.

(21) Appl. No.: 12/700,310

(22) Filed: Feb. 4, 2010

(65) Prior Publication Data

US 2011/0187928 A1    Aug. 4, 2011

(51) Int. Cl.
  *H04N 5/44* (2011.01)
  *G05B 23/02* (2006.01)
  *H04N 21/422* (2011.01)
  *H04N 21/431* (2011.01)
  *H04N 21/436* (2011.01)
  (Continued)

(52) U.S. Cl.
  CPC ............... *G05B 23/02* (2013.01); *H04N 5/44* (2013.01); *H04N 21/4131* (2013.01); *H04N 21/42219* (2013.01); *H04N 21/4316* (2013.01); *H04N 21/4363* (2013.01); *H04N 21/43615* (2013.01); *H04N 21/44231* (2013.01); *H04N 21/488* (2013.01); *H04N 21/4108* (2013.01)

(58) Field of Classification Search
  USPC ....... 348/552, 553, 563, 565, 569, 734, 705, 348/706, 564, 460, 461, 462, 465, 468; 725/153, 50, 133, 141; 340/12.29, 12.52, 340/12.53; 710/15, 17, 18
  See application file for complete search history.

(56) References Cited

U.S. PATENT DOCUMENTS

| | | |
|---|---|---|
| 4,386,436 A | 5/1983 | Kocher et al. |
| 4,581,606 A | 4/1986 | Mallory |

(Continued)

FOREIGN PATENT DOCUMENTS

| | | |
|---|---|---|
| CA | 2 367 988 A1 | 4/1998 |
| CN | 105814555 A | 7/2016 |

(Continued)

OTHER PUBLICATIONS

International Search Report for PCT/EP2011/051608 mailed on May 30, 2011.

(Continued)

*Primary Examiner* — Brian Yenke
*Assistant Examiner* — Humam Satti
(74) *Attorney, Agent, or Firm* — Kilpatrick Townsend & Stockton LLP

(57) ABSTRACT

A method of notifying a user of a status of an electronic appliance is presented. Examples of the electronic appliance may include, but are not limited to, refrigerators, freezers, dishwashers, ovens, and clothes washers and dryers. In the method, an entertainment system device receives a message from the appliance via a communication link, wherein the message indicates the status of the appliance. In response to receiving the message, the device transmits a command to a second device of the entertainment system to select an input of the second device associated with the first device. The first device transmits data indicating the status over a media content interface to the selected input of the second device for presentation to the user.

20 Claims, 5 Drawing Sheets

(51) Int. Cl.
  *H04N 21/4363* (2011.01)
  *H04N 21/442* (2011.01)
  *H04N 21/488* (2011.01)
  *H04N 21/41* (2011.01)

(56) References Cited

U.S. PATENT DOCUMENTS

| | | | |
|---|---|---|---|
| 4,728,949 A * | 3/1988 | Platte et al. | 340/12.52 |
| 4,959,713 A | 9/1990 | Morotomi et al. | |
| 5,400,246 A | 3/1995 | Wilson et al. | |
| 5,770,896 A | 6/1998 | Nakajima | |
| 5,805,442 A | 9/1998 | Crater et al. | |
| 5,822,012 A * | 10/1998 | Jeon et al. | 348/553 |
| 5,894,331 A | 4/1999 | Yang | |
| 5,926,090 A | 7/1999 | Taylor et al. | |
| 5,970,030 A | 10/1999 | Dimitri et al. | |
| 6,081,758 A | 6/2000 | Parvulescu | |
| 6,104,334 A | 8/2000 | Allport | |
| 6,182,094 B1 | 1/2001 | Humpleman et al. | |
| 6,330,621 B1 | 12/2001 | Bakke et al. | |
| 6,377,858 B1 | 4/2002 | Koeppe | |
| 6,405,284 B1 | 6/2002 | Bridge | |
| 6,502,166 B1 | 12/2002 | Cassidy | |
| 6,529,230 B1 | 3/2003 | Chong | |
| 6,553,375 B1 | 4/2003 | Huang et al. | |
| 6,662,282 B2 | 12/2003 | Cochran | |
| 6,756,998 B1 | 6/2004 | Bilger | |
| 6,976,187 B2 | 12/2005 | Arnott et al. | |
| 6,989,731 B1 * | 1/2006 | Kawai | G05B 19/0428 340/3.1 |
| 7,009,528 B2 | 3/2006 | Griep | |
| 7,010,332 B1 | 3/2006 | Irvin et al. | |
| 7,088,238 B2 * | 8/2006 | Karaoguz | H04L 12/2803 340/3.1 |
| 7,143,298 B2 | 11/2006 | Wells et al. | |
| 7,234,074 B2 | 6/2007 | Cohn et al. | |
| 7,346,917 B2 * | 3/2008 | Gatto et al. | 725/5 |
| 7,372,370 B2 | 5/2008 | Stults et al. | |
| 7,386,666 B1 | 6/2008 | Beauchamp et al. | |
| 7,395,369 B2 | 7/2008 | Sepez et al. | |
| 7,395,546 B1 * | 7/2008 | Asmussen | H04N 5/76 379/142.05 |
| 7,574,494 B1 * | 8/2009 | Mayernick et al. | 709/222 |
| 7,590,703 B2 | 9/2009 | Cashman et al. | |
| 7,640,351 B2 | 12/2009 | Reckamp et al. | |
| 7,694,005 B2 | 4/2010 | Reckamp et al. | |
| 7,739,718 B1 | 6/2010 | Young et al. | |
| 7,861,034 B2 | 12/2010 | Yamamoto et al. | |
| 7,870,232 B2 | 1/2011 | Reckamp et al. | |
| 7,945,297 B2 | 5/2011 | Philipp | |
| 7,969,318 B2 | 6/2011 | White et al. | |
| 8,086,757 B2 | 12/2011 | Chang | |
| 8,106,768 B2 | 1/2012 | Neumann | |
| 8,156,368 B2 | 4/2012 | Chambliss et al. | |
| 8,171,148 B2 | 5/2012 | Lucas et al. | |
| 8,180,735 B2 | 5/2012 | Ansari et al. | |
| 8,201,261 B2 | 6/2012 | Barfield et al. | |
| 8,221,290 B2 | 7/2012 | Vincent et al. | |
| 8,275,143 B2 | 9/2012 | Johnson | |
| 8,289,157 B2 | 10/2012 | Patenaude et al. | |
| 8,290,545 B2 | 10/2012 | Terlizzi | |
| 8,310,335 B2 | 11/2012 | Sivakkolundhu | |
| 8,316,413 B2 | 11/2012 | Crabtree | |
| 8,320,578 B2 | 11/2012 | Kahn et al. | |
| 8,335,312 B2 | 12/2012 | Gerhardt et al. | |
| 8,413,204 B2 | 4/2013 | White et al. | |
| 8,498,572 B1 | 7/2013 | Schooley et al. | |
| 8,516,087 B2 | 8/2013 | Wilson et al. | |
| 8,550,368 B2 | 10/2013 | Butler et al. | |
| 8,619,136 B2 | 12/2013 | Howarter et al. | |
| 8,644,525 B2 | 2/2014 | Bathurst et al. | |
| 8,645,327 B2 | 2/2014 | Falkenburg et al. | |
| 8,786,698 B2 | 7/2014 | Chen et al. | |
| 8,799,413 B2 | 8/2014 | Taylor et al. | |
| 8,898,709 B2 | 11/2014 | Crabtree | |
| 8,930,700 B2 | 1/2015 | Wielopolski | |
| 8,965,170 B1 | 2/2015 | Benea et al. | |
| 9,019,111 B1 | 4/2015 | Sloo et al. | |
| 9,049,567 B2 | 6/2015 | Le Guen et al. | |
| 2002/0019725 A1 | 2/2002 | Petite | |
| 2002/0063633 A1 * | 5/2002 | Park | 340/825.69 |
| 2003/0052789 A1 | 3/2003 | Colmenarez et al. | |
| 2003/0097452 A1 * | 5/2003 | Kim et al. | 709/229 |
| 2003/0126593 A1 | 7/2003 | Mault | |
| 2003/0133551 A1 * | 7/2003 | Kahn | 379/102.03 |
| 2003/0140352 A1 * | 7/2003 | Kim | 725/133 |
| 2003/0201900 A1 | 10/2003 | Bachinski et al. | |
| 2004/0019489 A1 | 1/2004 | Funk et al. | |
| 2004/0117038 A1 * | 6/2004 | Karaoguz et al. | 700/11 |
| 2004/0117843 A1 * | 6/2004 | Karaoguz et al. | 725/108 |
| 2004/0121725 A1 | 6/2004 | Matsui | |
| 2004/0128034 A1 | 7/2004 | Lenker et al. | |
| 2004/0148419 A1 | 7/2004 | Chen et al. | |
| 2004/0148632 A1 * | 7/2004 | Park et al. | 725/81 |
| 2004/0260407 A1 | 12/2004 | Wimsatt | |
| 2004/0266419 A1 * | 12/2004 | Arling et al. | 455/420 |
| 2005/0038875 A1 * | 2/2005 | Park | 709/219 |
| 2005/0188315 A1 | 8/2005 | Campbell et al. | |
| 2005/0200478 A1 | 9/2005 | Koch et al. | |
| 2005/0245292 A1 | 11/2005 | Bennett et al. | |
| 2005/0264698 A1 * | 12/2005 | Eshleman | H04N 5/775 348/565 |
| 2005/0289614 A1 * | 12/2005 | Baek et al. | 725/80 |
| 2006/0011145 A1 | 1/2006 | Kates | |
| 2006/0087428 A1 * | 4/2006 | Wolfe et al. | 340/539.22 |
| 2006/0136968 A1 * | 6/2006 | Han et al. | 725/71 |
| 2006/0143679 A1 * | 6/2006 | Yamada | H04N 5/268 725/131 |
| 2006/0155389 A1 | 7/2006 | Pessolano et al. | |
| 2007/0044119 A1 | 2/2007 | Sullivan et al. | |
| 2007/0078910 A1 | 4/2007 | Bopardikar | |
| 2007/0117843 A1 * | 5/2007 | Bi | A61K 31/47 514/313 |
| 2007/0129220 A1 | 6/2007 | Bardha | |
| 2007/0142022 A1 | 6/2007 | Madonna et al. | |
| 2007/0146545 A1 * | 6/2007 | Iwahashi | H04N 5/45 348/553 |
| 2007/0157258 A1 | 7/2007 | Jung et al. | |
| 2007/0192486 A1 * | 8/2007 | Wilson | H04L 12/282 709/225 |
| 2007/0256085 A1 | 11/2007 | Reckamp et al. | |
| 2007/0271518 A1 | 11/2007 | Tischer et al. | |
| 2008/0021971 A1 * | 1/2008 | Halgas | 709/207 |
| 2008/0022322 A1 | 1/2008 | Grannan et al. | |
| 2008/0062258 A1 | 3/2008 | Bentkovski et al. | |
| 2008/0062965 A1 | 3/2008 | Silva et al. | |
| 2008/0109095 A1 | 5/2008 | Braithwaite et al. | |
| 2008/0114963 A1 | 5/2008 | Cannon et al. | |
| 2008/0123825 A1 | 5/2008 | Abramson et al. | |
| 2008/0140736 A1 | 6/2008 | Jarno | |
| 2008/0163330 A1 * | 7/2008 | Sparrell | 725/142 |
| 2008/0278635 A1 | 11/2008 | Hardacker et al. | |
| 2008/0284905 A1 | 11/2008 | Chuang | |
| 2008/0288876 A1 * | 11/2008 | Fleming | G06F 3/167 715/761 |
| 2008/0297660 A1 * | 12/2008 | Shioya | H04N 5/44 348/705 |
| 2009/0069038 A1 | 3/2009 | Olague et al. | |
| 2009/0138507 A1 | 5/2009 | Burckart et al. | |
| 2009/0146834 A1 | 6/2009 | Huang | |
| 2009/0165069 A1 * | 6/2009 | Kirchner | 725/110 |
| 2009/0167555 A1 * | 7/2009 | Kohanek | 340/825.57 |
| 2009/0190040 A1 * | 7/2009 | Watanabe et al. | 348/725 |
| 2009/0249428 A1 | 10/2009 | White et al. | |
| 2010/0031286 A1 | 2/2010 | Gupta et al. | |
| 2010/0046918 A1 * | 2/2010 | Takao | G11B 20/00086 386/241 |
| 2010/0122284 A1 * | 5/2010 | Yoon | H04N 5/4401 725/33 |
| 2010/0138007 A1 | 6/2010 | Clark et al. | |
| 2010/0138858 A1 | 6/2010 | Velazquez et al. | |
| 2010/0146445 A1 | 6/2010 | Kraut | |
| 2010/0211546 A1 | 8/2010 | Grohman et al. | |

(56) References Cited

U.S. PATENT DOCUMENTS

| | | |
|---|---|---|
| 2010/0321151 A1 | 12/2010 | Matsuura et al. |
| 2011/0030016 A1 | 2/2011 | Pino et al. |
| 2011/0032423 A1 | 2/2011 | Jing et al. |
| 2011/0093126 A1 | 4/2011 | Toba et al. |
| 2011/0119325 A1 | 5/2011 | Paul et al. |
| 2011/0150432 A1 | 6/2011 | Paul et al. |
| 2011/0156862 A1 | 6/2011 | Langer |
| 2011/0187930 A1 | 8/2011 | Crabtree |
| 2011/0187931 A1 | 8/2011 | Kim |
| 2011/0202956 A1 | 8/2011 | Connelly et al. |
| 2011/0270549 A1 | 11/2011 | Jeansonne et al. |
| 2011/0282837 A1 | 11/2011 | Gounares et al. |
| 2011/0283311 A1 | 11/2011 | Luong |
| 2011/0295396 A1 | 12/2011 | Chinen et al. |
| 2012/0019388 A1 | 1/2012 | Kates et al. |
| 2012/0047532 A1 | 2/2012 | McCarthy |
| 2012/0059495 A1 | 3/2012 | Weiss et al. |
| 2012/0069246 A1 | 3/2012 | Thornberry et al. |
| 2012/0094696 A1 | 4/2012 | Ahn et al. |
| 2012/0124456 A1 | 5/2012 | Perez et al. |
| 2012/0271670 A1 | 10/2012 | Zaloom |
| 2012/0280802 A1 | 11/2012 | Yoshida et al. |
| 2012/0291068 A1 | 11/2012 | Khushoo et al. |
| 2012/0326835 A1 | 12/2012 | Cockrell et al. |
| 2013/0046800 A1 | 2/2013 | Assi et al. |
| 2013/0053063 A1 | 2/2013 | McSheffrey |
| 2013/0060358 A1 | 3/2013 | Li et al. |
| 2013/0070044 A1 | 3/2013 | Naidoo et al. |
| 2013/0074061 A1 | 3/2013 | Averbuch et al. |
| 2013/0090213 A1 | 4/2013 | Amini et al. |
| 2013/0138757 A1 | 5/2013 | Ferron |
| 2013/0152139 A1 | 6/2013 | Davis et al. |
| 2013/0204408 A1 | 8/2013 | Thiruvengada et al. |
| 2013/0267383 A1 | 10/2013 | Watterson |
| 2013/0300576 A1 | 11/2013 | Sinsuan et al. |
| 2013/0318559 A1 | 11/2013 | Crabtree |
| 2013/0321637 A1 | 12/2013 | Frank et al. |
| 2013/0324247 A1 | 12/2013 | Esaki et al. |
| 2014/0101465 A1 | 4/2014 | Wang et al. |
| 2014/0168277 A1 | 6/2014 | Ashley et al. |
| 2014/0192197 A1 | 7/2014 | Hanko et al. |
| 2014/0218517 A1 | 8/2014 | Kim et al. |
| 2014/0266669 A1 | 9/2014 | Fadell et al. |
| 2014/0266684 A1 | 9/2014 | Poder et al. |
| 2014/0310075 A1 | 10/2014 | Ricci |
| 2014/0333529 A1 | 11/2014 | Kim et al. |
| 2014/0351832 A1 | 11/2014 | Cho et al. |
| 2014/0362201 A1 | 12/2014 | Nguyen et al. |
| 2014/0373074 A1 | 12/2014 | Hwang et al. |
| 2015/0029096 A1 | 1/2015 | Ishihara |
| 2015/0054910 A1 | 2/2015 | Offen et al. |
| 2015/0106866 A1 | 4/2015 | Fujita |
| 2015/0143408 A1 | 5/2015 | Sallas |
| 2015/0156612 A1 | 6/2015 | Vemulapalli |
| 2015/0159401 A1 | 6/2015 | Patrick et al. |
| 2015/0160623 A1 | 6/2015 | Holley |
| 2015/0160634 A1 | 6/2015 | Smith et al. |
| 2015/0160635 A1 | 6/2015 | Schofield et al. |
| 2015/0160636 A1 | 6/2015 | McCarthy et al. |
| 2015/0160663 A1 | 6/2015 | McCarthy et al. |
| 2015/0161452 A1 | 6/2015 | McCarthy et al. |
| 2015/0161882 A1 | 6/2015 | Lett |
| 2015/0162006 A1 | 6/2015 | Kummer |
| 2015/0163411 A1 | 6/2015 | McCarthy, III et al. |
| 2015/0163412 A1 | 6/2015 | Holley et al. |
| 2015/0163535 A1 | 6/2015 | McCarthy et al. |
| 2015/0172742 A1 | 6/2015 | Richardson |
| 2015/0281824 A1 | 10/2015 | Nguyen et al. |
| 2015/0309487 A1 | 10/2015 | Lyman |
| 2016/0063854 A1 | 3/2016 | Burton et al. |
| 2016/0066046 A1 | 3/2016 | Mountain |
| 2016/0091471 A1 | 3/2016 | Benn |
| 2016/0109864 A1 | 4/2016 | Lonn |
| 2016/0121161 A1 | 5/2016 | Mountain |
| 2016/0123741 A1 | 5/2016 | Mountain |
| 2016/0182249 A1 | 6/2016 | Lea |
| 2016/0191912 A1 | 6/2016 | Lea et al. |
| 2016/0191990 A1 | 6/2016 | McCarthy |
| 2016/0203700 A1 | 7/2016 | Bruhn et al. |

FOREIGN PATENT DOCUMENTS

| | | | |
|---|---|---|---|
| EP | 2 736 027 | A1 | 5/2014 |
| GB | 2 304 952 | A | 3/1997 |
| GB | 2304952 | A | 3/1997 |
| JP | 2008148016 | A | 6/2008 |
| WO | 93/20544 | A1 | 10/1993 |
| WO | 2004/068386 | A1 | 8/2004 |
| WO | 2011/095567 | A1 | 8/2011 |
| WO | 2016/034880 | A1 | 3/2016 |
| WO | 2016/066399 | A1 | 5/2016 |
| WO | 2016/066442 | A1 | 5/2016 |

OTHER PUBLICATIONS

Lamonica, Martin, "CES 2010 Preview: Green comes in many colors", retrieved from CNET.com (http://ces.cnet.com/8301-31045_1-10420381-269.html), Dec. 22, 2009, 2 pages.

International Search Report and Written Opinion of PCT/EP2011/051608 mailed on May 30, 2011, 13 pages.

U.S. Appl. No. 12/700,408, filed Feb. 4, 2010, Notice of Allowance mailed Jul. 28, 2012, 8 pages.

U.S. Appl. No. 13/680,934, filed Nov. 19, 2012, Non-Final Office Action mailed Oct. 2, 2013, pages.

Author Unknown, "Voice Activated TV using the Amulet Remote for Media Center," AmuletDevices.com, accessed on Jul. 14, 2014, 1 page. Retrieved from: http://www.amuletdevices.com/index.php/Features/television.html.

Author Unknown, "App for Samsung Smart TV®," Crestron Electronics, Inc., accessed on Jul. 14, 2014, 3 pages. Retrieved from: http://www.crestron.com/products/smart tv television apps/.

Author Unknown, "AllJoyn Onboarding Service Frameworks," Qualcomm Connected Experiences, Inc., accessed on Jul. 15, 2014, 9 pages. Retrieved from: https://www.alljoyn.org.

Author Unknown, "International Building Code Excerpts, Updated with recent code changes that impact electromagnetic locks," Securitron, Assa Abloy, 2007, 2009, 2 pages. Retrieved from: www.securitron.com/Other/.../New_IBC-IFC_Code_Language.pdf.

Robbins, Gordon, Deputy Chief, "Addison Fire Department Access Control Installation," 2006 International Fire Code, Section 1008.1.3.4, 4 pages.

The Office Action dated Dec. 16, 2013 for Mexican Patent Application No. MX/a/2012/008882 is not translated into English. This document is from prosecution of the corresponding foreign matter for which we do not have a translation. 3 pages.

U.S. Appl. No. 13/680,934, filed Nov. 19, 2012, Final Office Action mailed Feb. 10, 2014, 13 pages.

U.S. Appl. No. 13/680,934, filed Nov. 19, 2012, Notice of Allowance mailed Apr. 30, 2014, 9 pages.

U.S. Appl. No. 13/680,934, filed Nov. 19, 2012, Notice of Allowance mailed Jul. 25, 2014, 11 pages.

"Acoustic/Ultrasound Ultrasonic Flowmeter Basics," Questex Media Group LLC, accessed on Dec. 16, 2014, 4 pages. Retrieved from http://www.sensorsmag.com/sensors/acoustic-ultrasound/ultrasonic-flowmeter-basics-842.

"Do you want to know how to find water leaks? Use a Bravedo Water Alert Flow Monitor to find out!", Bravedo.com, accessed Dec. 16, 2014, 10 pages Retrieved from http://bravedo.com/.

"Flow Pulse®, Non-invasive clamp-on flow monitor for pipes," Pulsar Process Measurement Ltd, accessed on Dec. 16, 2014, 2 pages. Retrieved from http://www.pulsar-pm.com/product-types/flow/flow-pulse.aspx.

"Introduction to Ultrasonic Doppler Flowmeters," OMEGA Engineering inc., accessed on Dec. 16, 2014, 3 pages. Retrieved from http://www.omega.com/prodinfo/ultrasonicflowmeters.html.

(56) References Cited

OTHER PUBLICATIONS

"Ultrasonic Flow Meters," RS Hydro Ltd, accessed on Dec. 16, 2014, 3 pages. Retrieved from http://www.rshydro.co.uk/ultrasonic-flowmeter.shtml.
Wang et al., "Mixed Sound Event Verification on Wireless Sensor Network for Home Automation," IEEE Transactions on Industrial Informatics, vol. 10, No. 1, Feb. 2014, 10 pages.
International Preliminary Report on Patentability for PCT/EP2011/051608 mailed Aug. 16, 2012, 8 pages.
International Search Report and Written Opinion for PCT/US2014/053876 mailed Nov. 26, 2014, 8 pages.
International Search Report and Written Opinion for PCT/US2014/055441 mailed Dec. 4, 2014, 10 pages.
International Search Report and Written Opinion for PCT/US2014/055476 mailed Dec. 30, 2014, 10 pages.
Mexican Institute of Industrial Property Office Action dated Nov. 1, 2013, for Mex. Patent Appln No. MX/a/2012/008882 is not translated into English, 3 pages.
International Search Report and Written Opinion for PCT/EP2015/073299 mailed Jan. 4, 2016, 12 pages.
International Search Report and Written Opinion for PCT/EP2015/073936 mailed Feb. 4, 2016, all pages.
U.S. Appl. No. 14/470,352, filed Aug. 27, 2014 Final Office Action mailed Mar. 17, 2016, all pages.
U.S. Appl. No. 14/485,188, filed Sep. 12, 2014, Final Rejection mailed Feb. 23, 2016, 22 pages.
U.S. Appl. No. 14/567,348, filed Dec. 11, 2014, Preinterview first office action mailed Jan. 20, 2016, 23 pages.
U.S. Appl. No. 14/107,132, filed Dec. 16, 2013, Final Rejection mailed Dec. 16, 2015, 32 pages.
Fong A.C.M. et al, "Indoor air quality control for asthma patients using smart home technology," Consumer Electronics (ISCE), 2011 IEEE 15th International Symposium on, IEEE, Jun. 14, 2011, pp. 18-19, XP032007803, DOI: 10.1109/ISCE.2011.5973774, ISBN: 978-1-61284-843-3, Abstract and sections 3 and 4.
Shunfeng Cheng et al., "A Wireless Sensor System for Prognostics and Health Management," IEEE Sensors Journal, IEEE Service Center, New York, NY, US, vol. 10, No. 4, Apr. 1, 2010, pp. 856-862, XP011304455, ISSN: 1530-437X, Sections 2 and 3.
International Search Report and Written Opinion for PCT/EP2015/070286 mailed Nov. 5, 2015, 13 pages.
International Search Report and Written Opinion for PCT/GB2015/052544 mailed Nov. 6, 2015, 10 pages.
International Search Report and Written Opinion for PCT/GB2015/052457 mailed Nov. 13, 2015, 11 pages.
U.S. Appl. No. 14/107,132, filed Dec. 16, 2013, Non Final Office Action mailed May 27, 2015, 26 pages.
U.S. Appl. No. 14/485,188, filed Sep. 12, 2014 Pre-Interview First Office Action mailed Jul. 29, 2015, 20 pages.
U.S. Appl. No. 14/485,188, filed Sep. 12, 2014 Pre-Interview First Office Action mailed Oct. 1, 2015, 10 pages.
U.S. Appl. No. 14/470,352, filed Aug. 27, 2014 Non Final Office Action mailed Nov. 20, 2015, 28 pages.
U.S. Appl. No. 14/470,352, filed Aug. 27, 2014 Non Final Office Action mailed Aug. 26, 2016, all pages.
U.S. Appl. No. 14/107,132, filed Dec. 16, 2013, Non Final Office Action mailed Jul. 18, 2016, all pages.
U.S. Appl. No. 14/715,248, filed May 18, 2015, Non-Final Rejection mailed Jul. 19, 2016, 34 pages.
U.S. Appl. No. 14/567,783, filed Dec. 11, 2014, Non Final Rejection mailed Aug. 23, 2016, all pages.
Mexican Institute of Industrial Property Notice of Allowance dated Feb. 10, 2014, for Mex. Patent Appln No. MX/a/2012/008882, 1 page.
International Search Report and Written Opinion for PCT/US2016/028126 mailed Jun. 3, 2016, all pages.
U.S. Appl. No. 12/700,310, filed Feb. 4, 2010 Non-Final Office Action mailed Jun. 16, 2016, 30 pages.
U.S. Appl. No. 14/528,739, filed Oct. 30, 2014 Notice of Allowance mailed Jun. 23, 2016, 34 pages.
U.S. Appl. No. 14/485,188, filed Sep. 12, 2014, Non-Final Rejection mailed Jun. 17, 2016, 29 pages.
U.S. Appl. No. 14/710,331, filed May 12, 2015, Non-Final Rejection mailed May 20, 2016, 42 pages.
International Preliminary Report on Patentability for PCT/US2014/055441 issued Jun. 14, 2016, 8 pages.
International Preliminary Report on Patentability for PCT/US2014/053876 issued Jun. 14, 2016, 7 pages.
U.S. Appl. No. 14/567,765, filed Dec. 11, 2014, Preinterview first office action mailed Apr. 8, 2016, 30 pages.
U.S. Appl. No. 14/577,717, filed Dec. 19, 2014, Preinterview first office action mailed Apr. 4, 2016, 29 pages.
U.S. Appl. No. 14/584,075, filed Dec. 29, 2014, Non-Final Rejection mailed Apr. 1, 2016, 40 pages.
International Preliminary Report on Patentability for PCT/US2014/055476 issued Jun. 14, 2016, 9 pages.

* cited by examiner

ELECTRONIC APPLIANCE STATUS NOTIFICATION VIA A HOME ENTERTAINMENT SYSTEM

BACKGROUND

The typical home entertainment system often includes multiple interconnected electronic components configured to enhance a user's enjoyment of audio/video content, such as movies, sporting events, music, and the like. For example, a home entertainment system including a television, a television receiver or set-top box, and a digital versatile disc (DVD) player may allow a user to view various types of entertainment from multiple sources. In this case, the user may view live broadcast television programming, such as from a cable or satellite television content provider, as well as watch DVD-based content, from the same television. The addition of other system components, such as a standalone digital video recorder (DVR), compact disc (CD) player, or audio receiver and connected speakers, may allow further flexibility in enjoying audio and/or video content.

At times, a user enjoying the audio and/or video content provided by a home entertainment system may be so engrossed in, or otherwise distracted by, that content that one or more operating household appliances, such as an oven or stove, dishwasher, clothes washer, or the like, that require user attention may remain unattended. Other types of devices or appliances that may also require user attention, such as a landline or cellular telephone receiving an incoming call, may also require attention that may be difficult to garner from a user who is enjoying a movie or television program.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
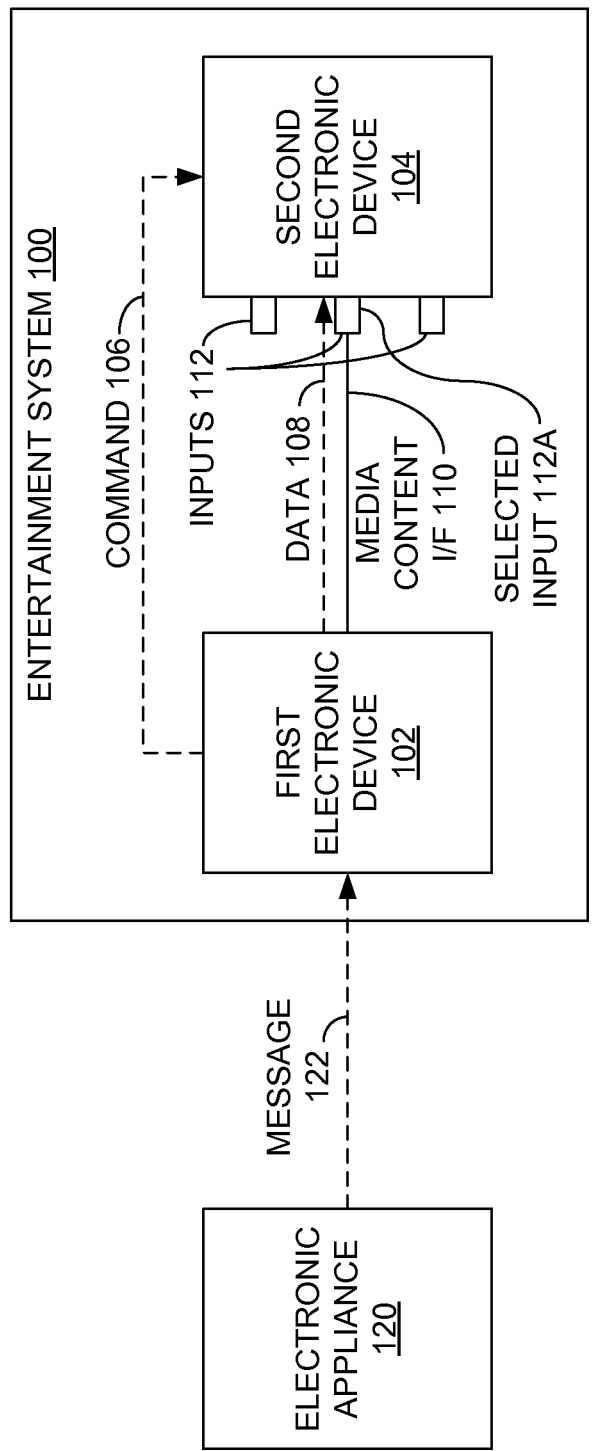
FIG. 1 is a simplified block diagram of an entertainment system communicatively coupled with an electronic appliance according to an embodiment of the invention.

FIG. 1 is a simplified block diagram of an entertainment system 100 communicatively coupled with an electronic appliance 120 according to an embodiment of the invention. The entertainment system 100 in FIG. 1 employs a first electronic device 102 and a second electronic device 104, although the entertainment system 100 may include more devices in other implementations. In one example, the first device 102 may be a television receiver or set-top box, while the second device 104 may be a television 104 receiving audio and/or video content from the receiver 102. Other combinations of devices other than those exemplified in FIG. 1 are also possible.

The electronic appliance 120 may be any appliance or device that may require some level of human interaction based on a current status of the appliance 120. Examples of the appliance 120 include household appliances, including but not limited to stoves, ovens, dishwashers, clothes washers, clothes dryers, refrigerators, and freezers. Other examples of devices that may be considered appliances include landline and cellular telephones, weather observation stations, and desktop and laptop computers. In each case, the appliance 120 may complete some phase of operation, such as a laundry or cooking cycle, which requires the intervention or attention of a user. Generally, the appliance 120 employs the entertainment system 100 to inform a user as to that phase or task completion, to any error conditions, or any other status condition about which the user may want to be informed.

Figure 2:
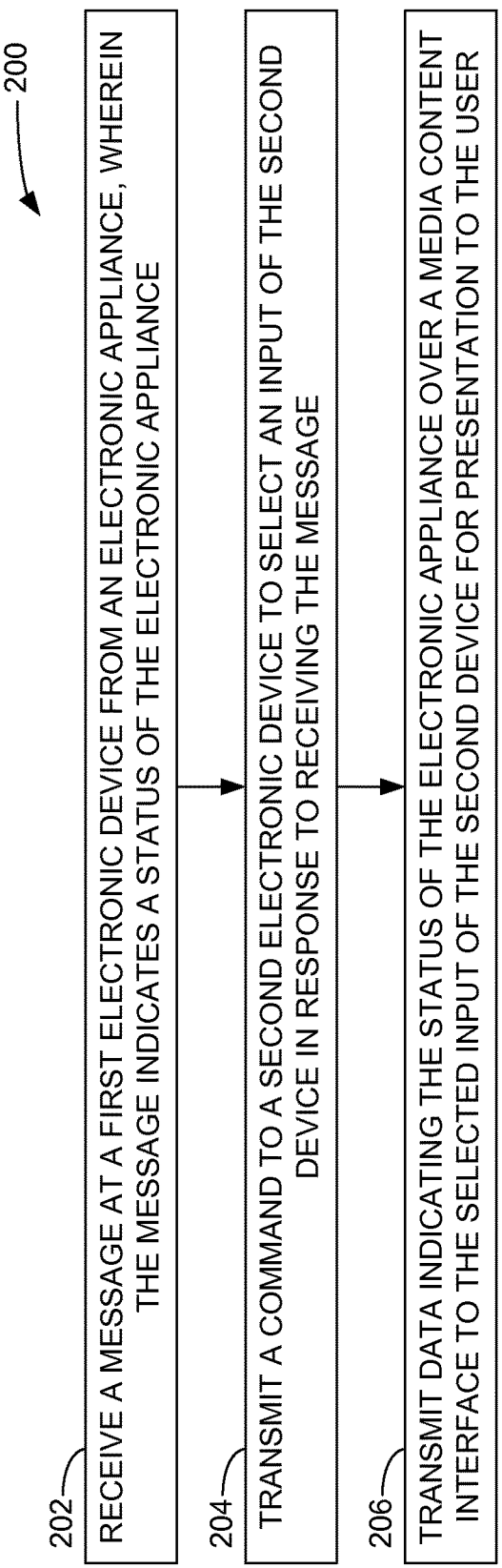
FIG. 2 is a flow diagram of a method according to an embodiment of the invention of notifying a user of a status of an electronic appliance.

FIG. 2 presents a method 200 of notifying a user of a status of the electronic appliance 120 of FIG. 1 via the entertainment system 100 according to an embodiment of the invention. In the method 200, the first electronic device 102 receives a message 122 from the electronic appliance 120 (operation 202). The message 122 indicates a status of the appliance 120. The status may be somewhat detailed, such as an identification of a completed operation or error condition, or just may be a general status indication involving the appliance 120. In response to receiving the message 122, the first electronic device 102 transmits a command 106 to the second electronic device 104 to select an input 112A of the second device 104 associated with the first device 104 (operation 204). The selected input 112A may be one of at least two inputs 112 utilized by the second device 104 to receive media content, such as audio and/or video content, from multiple sources. The first device 120 then transmits data 108 indicating the status of the appliance 120 over a media content interface 110 to the selected input 112A of the second device 104 for presentation to the user (operation 206).

While the operations of FIG. 2 are depicted as being executed in a particular order, other orders of execution, including concurrent or overlapping execution of two or more operations, may be possible. In another embodiment, a computer-readable storage medium may have encoded thereon instructions for a processor or other control circuitry of the first electronic device 102 of FIG. 1 to implement the method 200.

As a result of the method 200, a user of the entertainment system 100 may be notified of a status condition of the appliance 120. Consequently, the user need not forego enjoyment of the entertainment system 100 to attend to the appliance 120 upon completion of a particular appliance 120 operation or occurrence of an unexpected situation involving the appliance 120, even if the user is not in close proximity to the appliance 120. Additional advantages may be recognized from the various implementations of the invention discussed in greater detail below.

Figure 3:
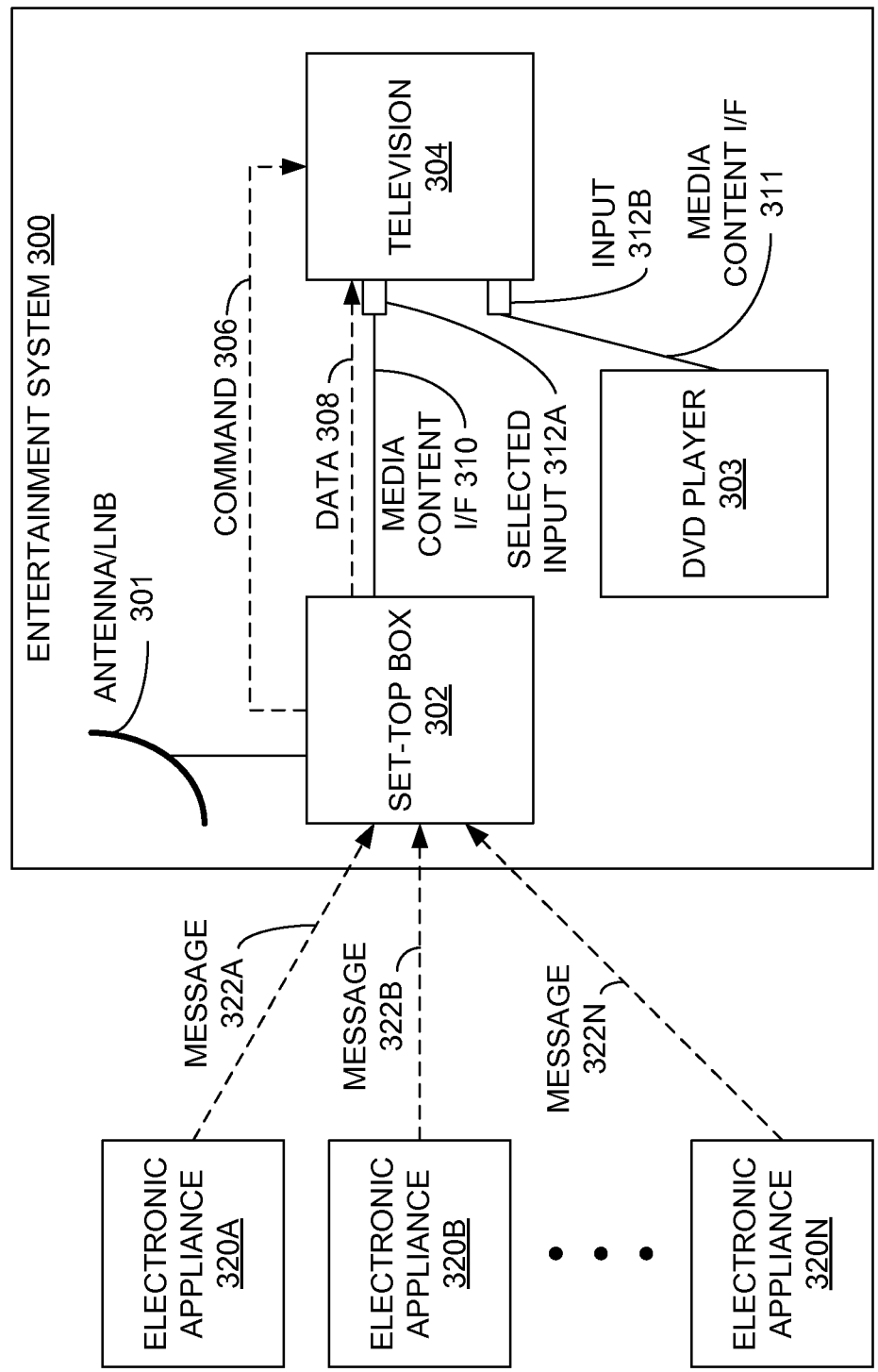
FIG. 3 is a block diagram of an entertainment system communicatively coupled with several appliances according to an embodiment of the invention.

According to another embodiment of the invention, FIG. 3 provides a block diagram of a more specific entertainment system 300 configured to receive status information from multiple appliances 320A, 320B, . . . , 320N, and inform a user of the entertainment system 300 of such status. As shown in FIG. 3, the entertainment system 300 includes a television receiver or set-top box 302 and a digital versatile disc (DVD) player 303, each of which is coupled to a television 304 or video monitor by way of separate media content interfaces 310, 311. Other devices may also be included in the entertainment system 300, such as a stand-alone digital video recorder (DVR) unit, an audio receiver or amplifier, and a gaming system, but such devices are not depicted in FIG. 3 to simplify the following discussion.

In the particular example of FIG. 3, the set-top box 302 is a satellite television programming receiver adapted to receive audio and/or video content by way of an antenna/low-noise block-converter (LNB) combination 301. However, other types of television set-top boxes, such as cable and terrestrial ("over-the-air") set-top boxes, may be employed to similar effect in other implementations. Moreover, other types of entertainment system devices, such as DVR units, DVD players, and so on, may receive appliance status information, as is described in greater detail below.

The appliances 320, such as a dishwasher, clothes washer and/or dryer, oven, and the like, may be located at various locations throughout a home that contains the entertainment system 300. Similar to the environment described in FIG. 1, each of the appliances 320 may send one or more messages 322A, 322B, . . . , 322N indicating a status of the corresponding appliance 320 to the set-top box 302. The messages 322 are transmitted over a communication link that may be wired or wireless in nature.

In response to receiving the message 322, the set-top box 302 generates and transmits a command 306 to the television 304 to select the input 312A associated with the media content interface 310 corresponding to the set-top box 302. Thus, the set-top box 302 configures the television 304 to accept content from the set-top box 302 (as opposed to the DVD player 303) for presentation to the user. The set-top box 32 then transmits data 308 indicating the status of the appliance 320 to the television 304 over the media content interface 130 communicatively coupling the set-top box 302 with the selected input 312A of the television 304. In turn, the television 304 presents the data, typically in audio and/or video form, to the user to apprise the user of the status of the appliance 320 originating the message 322.

Figure 4:
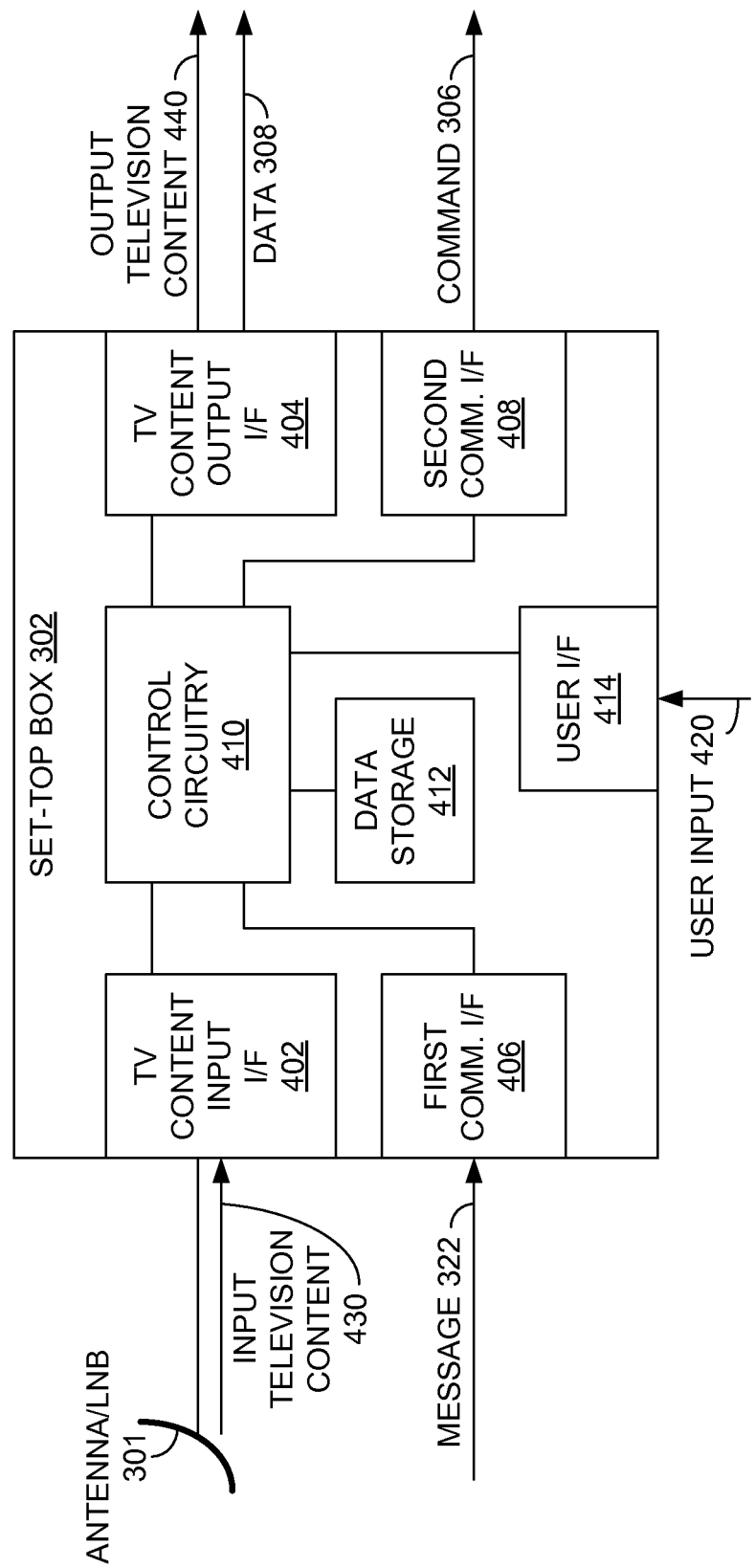
FIG. 4 is a block diagram of a television set-top box of the entertainment system of FIG. 3 according to embodiments of the invention.

FIG. 4 presents a block diagram of an example of the set-top box 302 depicted in FIG. 3. In this particular case, the set-top box 302 includes a television content input interface 402, a television content output interface 404, a first communication interface 406, a second communication interface 408, control circuitry 410, data storage 412, and a user interface 414. Other components or electronic circuits possibly included in the set-top box 302, such as a power supply and a "smart card" interface, are neither included in FIG. 4 nor discussed further herein to simplify the following discussion.

The television content input interface 402 (or, more generally, the media content input interface 402) receives multiple channels of audio and/or video content 430 received and frequency down-converted by the antenna/LNB 301. Such content 430 may be transported between the antenna/LNB 301 and the television content input interface 402 via coaxial cable or other wired or wireless means. The television content input interface 402 may also include one or more tuners for selecting particular programming channels of the incoming content 430 for forwarding to the television 304 or storing in the optional data storage 412, described more fully below. The television content input interface 402 may also perform any decryption, decoding, and similar processing of the received television content 430 required to place the content 430 in a format usable by the data storage 412 and the television content output interface 404. In one example, such a format may be one of the Motion Picture Experts Group (MPEG) formats, such as MPEG-2 or MPEG-4, although other media content format standards may be utilized in other embodiments.

The television content output interface 404 provides the selected and processed television content as output television content 440 to the television 304 of FIG. 3. To that end, the television content output interface 404 may encode the selected television content in accordance with one or more television output formats. For example, the television content output interface 404 may format the content for one or more of a composite or component video connection with associated audio connection, a modulated radio frequency (RF) connection, and a High Definition Multimedia Interface (HDMI) connection.

Continuing with FIG. 4, the first communication interface 406 is configured to receive a message 322 from an appliance 320, with the message 322 indicating a status of the appliance 320. The first communication interface 406 may employ any of a number of communication technologies to receive the message 322, including both wired and wireless varieties. In one example, the first communication interface 406 may be a power line interface, such as the kind standardized by the HomePlug® Powerline Alliance, which facilitates the transfer of control, status, and data information via the electrical power wiring of a home or other building. Thus, the appliance 320 may transfer its message 322 via it own electrical power cord, the electrical power wiring of the home, and the electrical power cord of the receiving set-top box 302. Other types of wired and wireless communication technologies, such as Ethernet, IEEE 1394, Bluetooth®, and Wi-Fi (IEEE 802.11), may be employed for communication of the messages 322 in other implementations.

The information incorporated in each of the messages 322 may depend on several factors, including the particular appliances 320 involved. In one example, the message 322 may include an identification of the sending appliance 320, such as an address. Further, the message 322 may include a destination identifier or address for the receiving set-top box 302, especially in systems in which more than one entertainment device may be receiving the messages 322. The transmitting appliance 320 may further include information concerning the status or associated operation in the appliance 320 causing the transmission of the message 322, such as by an alphanumeric code or textual explanation. For example, a dishwasher may transmit a message 322 indicating a wash-and-dry cycle has completed, or that such a cycle will be completed in some stated amount of time. With some appliances 320 now being able to detect error or failure conditions while performing a particular operation, the message 322 may indicate the particular error condition by way of a code or text. Additional or alternate types of information may be incorporated into the message 322 in other embodiments.

The second communication interface 408 of the set-top box 302 is configured to send one or more commands 306, such as an input selection command, to the television 304, under the direction of the control circuitry 410 in response to receiving a message 322. Generally, any communication technology implemented by the television 304 to receive commands may be utilized in the set-top box 302 to transmit the command 306. In an example in which the media content interface 310 is an HDMI, the set-top box 302 may utilize the Consumer Electronics Control (CEC) bus incorporated within the HDMI to transmit the command 306, presuming the television 304 possesses the capability to accept and process the commands 306 when transmitted using the CEC bus. Other wired connections, whether or not associated with the media content interface 310 coupling the set-top box 302 with the television 304, may be employed to carry the commands 306 in other embodiments, including but not limited to a phone connection, Ethernet, Universal Serial Bus (USB), and so forth.

In another implementation, the set-top box 302 may employ a wireless remote control interface as the second communication interface 408 to issue the command 306 via a remote control input interface of the television 304. More specifically, the second communication interface 408 may operate as a wireless (such as infrared (IR) or radio frequency (RF)) transmitter of remote control commands 306 that may be received by way of the television 304 remote control interface. With respect to IR transmission, the commands 306 may be issued by way of an IR diode coupled with the set-top box 302 via a wire or "tether" to allow the diode to be positioned within close proximity of the remote control receiving circuitry of the television 304. In another example, the second communication interface 408 may be capable of transmitting IR remote control commands at a relatively high power to allow the IR command signal to reflect off of nearby walls, ceiling, or furniture to reduce the need for direct line-of-sight between the second communication interface 408 of the set-top box 302 and the remote control interface of the television 304. In other implementations, other wireless communication technologies, such as Bluetooth® and Wi-Fi, are contemplated.

The control circuitry 410 is configured to control and/or access other components of the set-top box 302, including the television content input interface 402, the television content output interface 404, the first communication interface 406, and the second communication interface 408. The control circuitry 410 may include one or more processors, such as a microprocessor, microcontroller, or digital signal processor (DSP), configured to execute instructions directing the processor to perform the functions discussed more fully herein. The control circuitry 410 may also include memory or data storage adapted to contain such instructions. Such memory may also include data to aid the control circuitry 410 in performing the tasks more particularly described below. In another implementation, the control circuitry 410 may be strictly hardware-based logic, or may include a combination of hardware, firmware, and/or software elements.

With respect to the embodiments described herein, the control circuitry 410 receives the message 322 from the first communication interface 406. In response, the control circuitry 410 generates at least one command 306 via the second communication interface 408 to configure the television 304 properly for receipt and presentation of the data 308 to be transmitted to the television 304 for ultimate presentation to the user. In one implementation, since the television 304 possesses multiple inputs, at least one command 306 instructs the television 304 to select the input 312A communicatively coupled with the television content output interface 404 of the set-top box 302. As a result, the data 308, along with any television content 440 being delivered to the television 304, may be displayed or otherwise presented to the user.

In response to receiving the message 322, the set-top box 302 may transmit other commands 306 to the television 304 in addition to the input selection command. For example, the control circuitry 410 may generate an "on" or "active" command to awaken the television 304 from a current "off" or "standby" operational mode, in which television presentation of any indication of appliance status would not be possible. In another example, the set-top box 302 may generate other commands 306 affecting the presentation of the data 308 to the user, such as placing the television 304 in a picture-in-picture (PIP) mode, and adjusting the volume of the television 304. Once generated, the control circuitry 410 may transmit the commands 306 to the television 304 via the second communication interface 408, such as by remote control command, HDMI CEC commands, or the like, as described more completely above.

Figure 5:
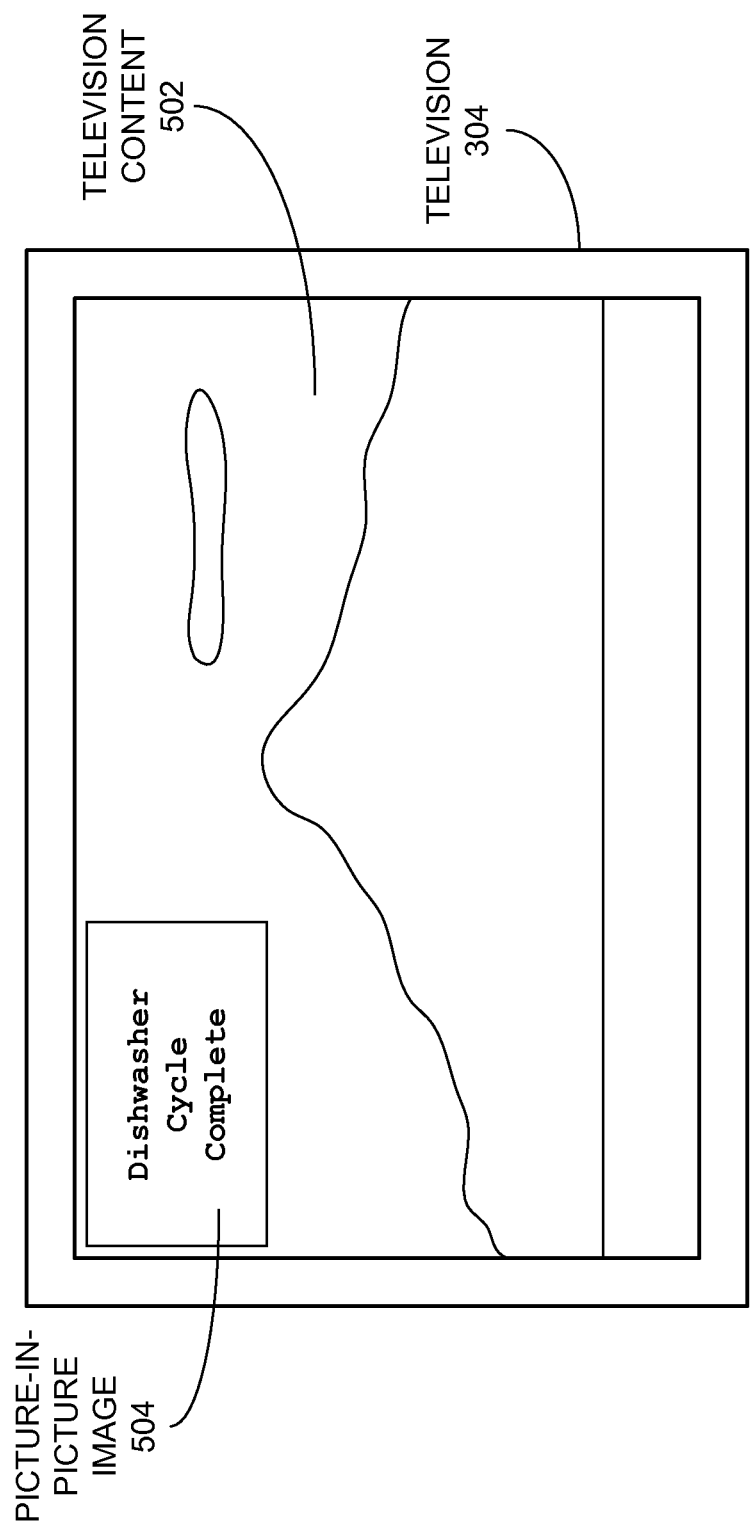
FIG. 5 is a graphical representation of a display of a television of the entertainment system of FIG. 3 according to an embodiment of the invention.

In response to receiving the message 320, the control circuitry 410 also generates data 308 indicating the status of the appliance 320. The data 308 may take any form recognizable by the television 304 so that the appliance 320 status may be presented to the user. For example, the data 308 may take the form of an audio and/or video signal to be transmitted via the television content output interface 404 to the television 304. In one specific implementation, as shown in FIG. 5, the data 308 may represent a picture-in-picture (PIP) image 504 (in this case, a text display indicating that the dishwasher has completed its operational cycle) incorporated within other television content 502 that is transmitted via the television content output interface 404 for visual presentation to the user by way of the television 304.

In addition to employing picture-in-picture functionality, the control circuitry 410 may pause the delivery of the television content 502 while the picture-in-picture image 504 is being displayed. To accomplish this task, the set-top box 302 may include data storage 412 that may be utilized to buffer or record the selected input television content 430. During the pause mode, the control circuitry 410 may cause the television content output interface 404 to provide a "screensaver" mode after some predetermined time period to prevent the picture-in-picture image 504 and the paused television content 502 from being "burned" into the display of the television 304. In that case, a representation of the data 308, such as the picture-in-picture image 504 shown in FIG. 5, may continue to be presented to the user in the absence of the accompanying television content 502, with the picture-in-picture image 504 being relocated on the display periodically to maintain the screensaver function.

In one implementation, the picture-in-picture image 504, along with the possibly paused television content 502, remains as presented on the television 304 until the user provides some sort of user input 420, such as a command to resume play of the television content 502. This user input 420 may be received via a user interface 414, such as a remote control input interface employing any wireless remote control technology, such as infrared (IR) or radio frequency (RF) signal receiver technology. In response to receiving the user input 420, the control circuitry 410 may remove the picture-in-picture image 504 from the television 304 display and resume playback of the associated television content 502 (if previously paused). In another implementation, any input received from the user via the user interface 414 may cause at least the removal of the picture-in-picture image 504, along with performing the function associated with the receiver user input 414.

More generally, the data 308 transmitted to the television 304 may take any form compatible with the television 304 for ultimate presentation to the user. For example, the data 308 may be represented as a video signal to be presented by way of the television 304, and/or as an audio signal to be output by way of audio speakers. Further, a video signal representing the data 304 may be a video signal to be displayed as a full screen image, or as a picture-in-picture image, such as the image 504 illustrated in FIG. 5. Further, any video image or representation may employ alphanumeric characters, graphical icons, or some combination thereof. In yet other arrangements, the data 308 may be textual data or some other form of digital information not of a video or audio nature that the television 304 may then process and present to the user as needed.

If the data 308 is transmitted as an audio signal, the set-top box 302 may transfer such a signal to either the television 304, an audio receiver (not shown in FIG. 3), or both. If an audio receiver is the intended destination, the set-top box 302 may transmit commands to the audio receiver that are similar to those commands 306 transferred to the television 304 to awaken the audio receiver, set an appropriate volume level, select an input corresponding to the set-top box 302, and so on, before transferring the audio signal representing the data 308 to the audio receiver for presentation to the user. For example, the set-top box 302 may cause the television 304 or audio receiver to raise or lower its volume level to help draw the attention of the user to the television 304 or audio receiver, thus making the notification of the appliance 320 status more effective.

To ensure that all information between the set-top box 302 and the television 304 is being received and processed correctly, the set-top box 302 may wait a predetermined period of time, such as one second or a fraction thereof, between the transmission of each command 306, as well as between the transmission of the commands 306 and the data 308.

To enable the set-top box 302 to perform the various operations described above, the set-top box 302 may provide means, such as a on-screen menu presented via the television 304, to allow the user to select between various configuration options to enable the functionality presented herein. For example, the user may identify the manufacturer and model of the television 304 to allow the set-top box 302 to communicate with the television 304 properly by way of HDMI, remote control, or the like. Other components of the entertainment system 300 with which the set-top box 302 may communicate, such as the audio receiver referenced above, or a second television, may be identified in a similar fashion. The user may also select which commands 306 are to be sent prior to the transmission of the data 308, as well as identify the format or protocol of the second communication interface 408 employed to transfer the commands 306.

Regarding communications between the appliances 320 and the set-top box 302, the user may be able to inform the set-top box 302 of the identities (such as manufacturer and model number) of the appliances 320 that may be transmitting the messages 322. The user may also associate each appliance with a particular communication network address so that the set-top box 302 may correctly interpret the status information provided by each appliance 320. Accordingly, the set-top box 302 may include in its data storage 412 information relating each possible type of appliance 320 with one or more status indications that may be issued therefrom. In one implementation, the set-top box 302 may download such information by way of the television content input interface 402, a separate communication interface, such as a phone or network connection, or from each appliance 320 directly.

At least some embodiments as described herein thus allow a user to be apprised of the operational status of a household electronic appliance, such as a dishwasher, oven, freezer, refrigerator, or even a telephone, by way of an entertainment system. For example, a user watching a television program may be notified that a clothes washer has finished its cycle, thus allowing the user to transfer the clothes to a dryer in a timely manner without having to monitor the washer closely. In one implementation, the signal may be transferred from the appliance to a set-top box, which then transfers data indicating the status to the television being watched. Further, the notification will reach the user even if the user is watching a program being delivered to the television from a DVD player, standalone DVR unit, or the like by way of commands from the set-top box instructing the television to provide information or content to the user via an input coupled with the set-top box. In addition, the set-top box may be turned on or awakened prior to transfer of the status data so that the user may be notified even if the user's attention is not directed to the entertainment system at that time, thus extending the reach of the notification.

While several embodiments of the invention have been discussed herein, other implementations encompassed by the scope of the invention are possible. For example, while various embodiments have been described within the context of a television set-top box and other entertainment electronics components, the design of other types of electronic systems that are capable of providing a user with information concerning electronic appliance operational status may employ various aspects of the systems and methods described above to similar effect. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of notifying a user of a status of an electronic appliance, the method comprising:
   at a first electronic device of an entertainment system, receiving a message from the electronic appliance via a communication link, wherein the message indicates the status of the electronic appliance;
   at the first electronic device, transmitting a first command to a second electronic device to awaken the second electronic device from an off state, wherein the first command is transmitted upon the receiving of the message from the electronic appliance;
   at the first electronic device, in response to receiving the message, transmitting a second command to the second electronic device of the entertainment system to select a input port of the second electronic device associated with the first electronic device, wherein the second command to select the input of the second electronic device associated with the first electronic device is transmitted after the first command to awaken the second electronic device is transmitted;

at the first electronic device, receiving video content;

at the first electronic device, transmitting data over a media content interface to the selected input for presentation to the user, wherein the data is transmitted as a picture-in-picture image within the video content, wherein the data indicates the status of the electronic appliance, and wherein the data includes a request for the user to interact with the electronic appliance;

pausing the video content upon transmitting the data, wherein the data includes the picture-in-picture image for presentation to the user; and removing the picture-in-picture image from the video content upon receiving a user input, and resuming presentation of the video content.

2. The method of claim 1, wherein:
the data comprises a video signal indicating the status for presentation to the user.

3. The method of claim 1, wherein:
the data comprises an audio signal indicating the status for presentation to the user.

4. The method of claim 1, further comprising:
at the first electronic device, waiting a predetermined time period between transmitting the second command and transmitting the data indicating the status.

5. The method of claim 1, wherein:
transmitting the second command comprises transmitting the second command over a consumer electronics control bus associated with the media content interface.

6. The method of claim 1, wherein:
transmitting the second command comprises transmitting a wireless remote control command via a remote control interface of the second electronic device.

7. The method of claim 1, wherein:
the first electronic device and the second electronic device are integrated as a single electronic device.

8. The method of claim 1, wherein:
the first electronic device comprises a television content receiver; and
the second electronic device comprises at least one of a television and an audio receiver.

9. The method of claim 1, further comprising:
at the first electronic device, outputting a screensaver in place of the paused video content and picture-in-picture image for a predetermined time period.

10. The method of claim 1, further comprising:
at the second electronic device, changing the volume of audio content associated with the video content when the video content includes the picture-in-picture image.

11. A television receiver, comprising:
one or more processors;
a non-transitory computer readable storage medium communicatively coupled to the one or more processors, wherein the non-transitory computer readable storage medium includes instructions that, when executed by the one or more processors, cause the one or more processors to perform operations including:
  receiving, at a first electronic device of an entertainment system, a message from the electronic appliance via a communication link, wherein the message indicates the status of the electronic appliance;
  transmitting, at the first electronic device, a first command to a second electronic device to awaken the second electronic device from an off state, wherein the first command is transmitted upon the receiving of the message from the electronic appliance;
  in response to receiving the message, transmitting, at the first electronic device, a second command to the second electronic device of the entertainment system to select a input port of the second electronic device associated with the first electronic device, wherein the second command to select the input of the second electronic device associated with the first electronic device is transmitted after the first command to awaken the second electronic device is transmitted;
  receiving, at the first electronic device, video content;
  transmitting, at the first electronic device, data over a media content interface to the selected input for presentation to the user, wherein the data is transmitted as a picture-in-picture image within the video content, wherein the data indicates the status of the electronic appliance, and wherein the data includes a request for the user to interact with the electronic appliance;
  pausing the video content upon transmitting the data, wherein the data includes the picture-in-picture image for presentation to the user; and
  removing the picture-in-picture image from the video content upon receiving a user input, and resuming presentation of the video content.

12. The television receiver of claim 11, wherein:
the data comprises a video signal indicating the status for presentation to the user.

13. The television receiver of claim 11, wherein:
the data comprises an audio signal indicating the status for presentation to the user.

14. The television receiver of claim 11, wherein the operations further include:
at the first electronic device, waiting a predetermined time period between transmitting the second command and transmitting the data indicating the status.

15. The television receiver of claim 11, wherein:
transmitting the second command comprises transmitting the second command over a consumer electronics control bus associated with the media content interface.

16. The television receiver of claim 11, wherein:
transmitting the second command comprises transmitting a wireless remote control command via a remote control interface of the second electronic device.

17. The television receiver of claim 11, wherein:
the first electronic device and the second electronic device are integrated as a single electronic device.

18. The television receiver of claim 11, wherein:
the first electronic device comprises a television content receiver; and
the second electronic device comprises at least one of a television and an audio receiver.

19. The television receiver of claim 11, wherein the operations further include:
at the first electronic device, outputting a screensaver in place of the paused video content and picture-in-picture image for a predetermined time period.

20. The television receiver of claim 11, wherein the operations further include:
at the second electronic device, changing the volume of audio content associated with the video content when the video content includes the picture-in-picture image.

* * * * *